Nov. 9, 1954  F. W. SCHWINN  2,694,138
BACK LIGHT FOR USE ON CYCLES AND THE LIKE
Filed March 26, 1951  3 Sheets-Sheet 1
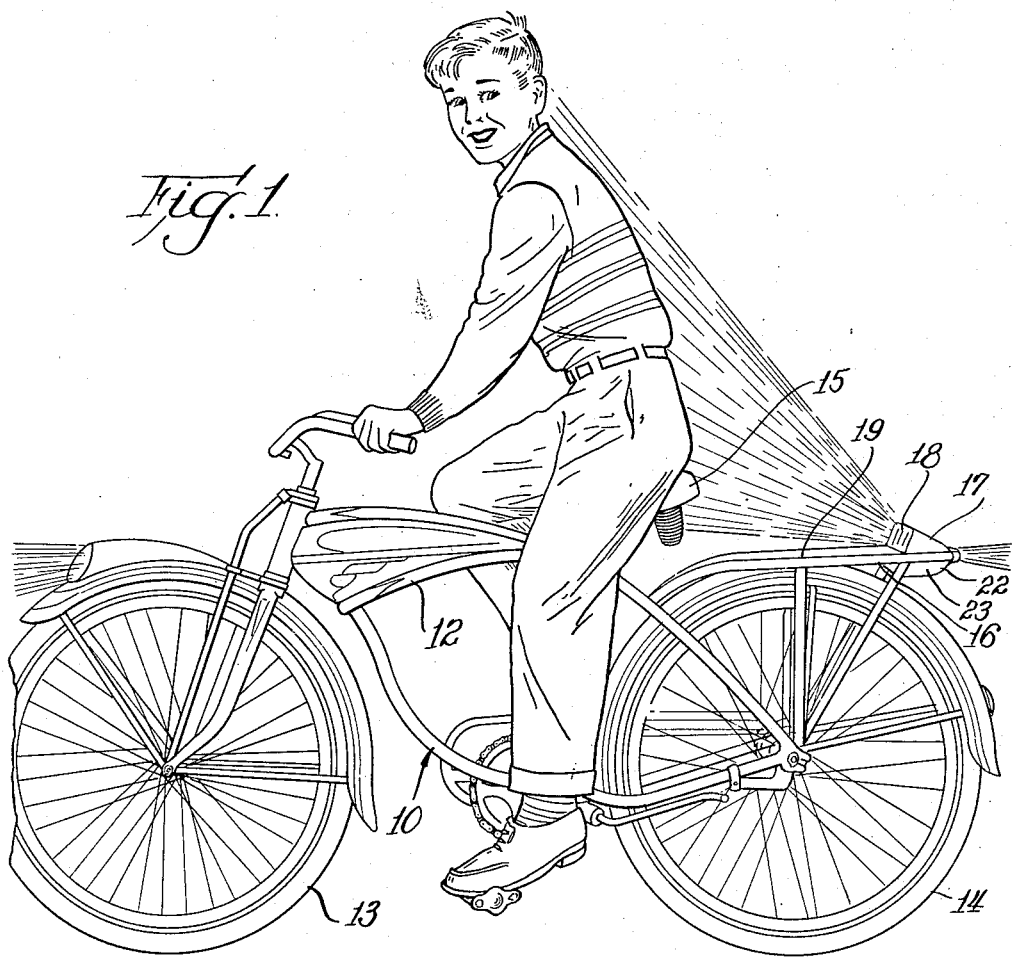
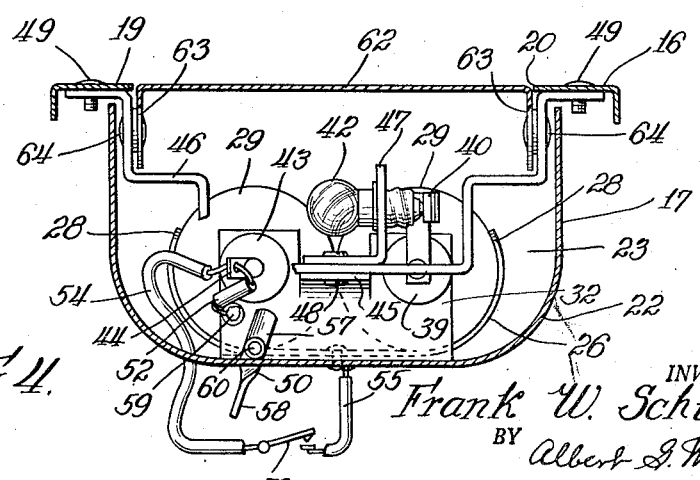
INVENTOR.
Frank W. Schwinn
BY Albert J. McCaleb
Atty.

Nov. 9, 1954      F. W. SCHWINN      2,694,138

BACK LIGHT FOR USE ON CYCLES AND THE LIKE

Filed March 26, 1951      3 Sheets-Sheet 2

INVENTOR.
Frank W. Schwinn
BY Albert G. McCaleb
Atty.

Nov. 9, 1954  F. W. SCHWINN  2,694,138
BACK LIGHT FOR USE ON CYCLES AND THE LIKE
Filed March 26, 1951  3 Sheets-Sheet 3

INVENTOR.
Frank W. Schwinn
BY Albert G. McCaleb
Atty.

United States Patent Office 2,694,138
Patented Nov. 9, 1954

2,694,138

BACK LIGHT FOR USE ON CYCLES AND THE LIKE

Frank W. Schwinn, Chicago, Ill.

Application March 26, 1951, Serial No. 217,607

3 Claims. (Cl. 240—7.55)

This invention relates to a back light adapted to use on cycles and the like to promote safety for cycle riders in night riding.

One of the general objects of my invention is to provide a light for use on cycles and the like which illuminates considerable portions of the cycle and rider to make them clearly visible from various angles to people in other vehicles, even though the cycle rider is outside the range of the vehicle head lights.

As another object, this invention has within its purview the provision of a light adapted to mounting on the rear of a bicycle or the like to project light forwardly and upwardly onto the back of the rider, as well as upon the bicycle, so as to render the bicycle and rider clearly visible at night from various angles and positions without interfering with the bicycle rider's normal vision.

My invention further comprehends the provision of a light unit for mounting at the rear of a cycle or the like, and adapted to project light forwardly in addition to serving as a tail light of the usual type.

Another object of my invention is to provide a light unit adapted to assembly with the rear carrier of a bicycle or the like and embodying a light projecting element normally adapted to disposition in substantially flush relationship with the top of the carrier and movable to an elevated position for projecting light forwardly and upwardly relative to the carrier.

Other objects and advantages of the invention will be apparent from the following description and the accompanying drawings in which similar characters of reference indicate similar parts throughout the several views.

Referring to the three sheets of drawings,

Fig. 1 is a side view illustrating the adaptation of a preferred embodiment of my invention to a bicycle and showing the manner in which light is projected upon a bicycle rider to promote safety in riding at night;

Fig. 4 is an end sectional view wherein the section is taken substantially on a line 4—4 of Fig. 2 and in the direction indicated by accompanying arrows;

Figure 2:
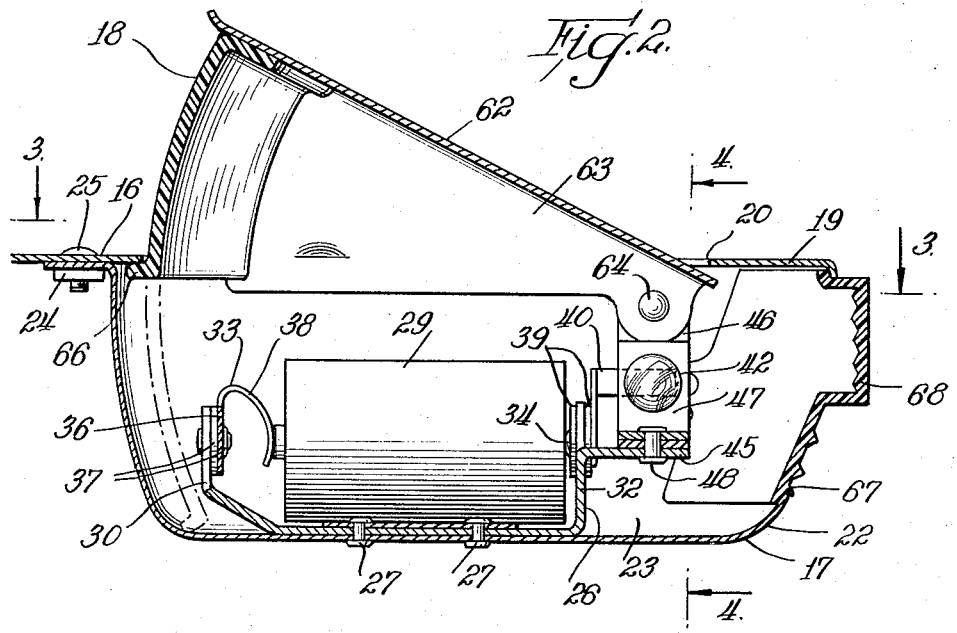
Fig. 2 is a fragmentary side sectional view in elevation and drawn to a larger scale to show structural details of the back light unit shown in Fig. 1.

The exemplary embodiments of my invention which are depicted herein for illustrative purposes are adapted to use on various types of cycles and the like in substantially the manner shown in Fig. 1; the characterizing feature being that a back light unit is constructed, mounted and arranged in reference to the cycle or the like, so that it projects light at the rear of the rider's seat, so as to effect illumination of the cycle and its rider without interfering with the rider's vision. As depicted in Fig. 1, a bicycle 10 includes a frame 12, front and rear wheels 13 and 14 respectively and a rider's seat 15. At the rear of the bicycle, behind the rider's seat and above the rear wheel 14, a supporting structure 16 is secured to the bicycle frame; said supporting structure, in the present instance, being a rear carrier and having a light unit 17 mounted at the rear end thereof. The light unit 17, for the purpose herein provided, embodies a lens 18 for projecting light upwardly and forwardly from the rear carrier structure, longitudinally of the frame and laterally toward the rider's seat.

Figure 3:
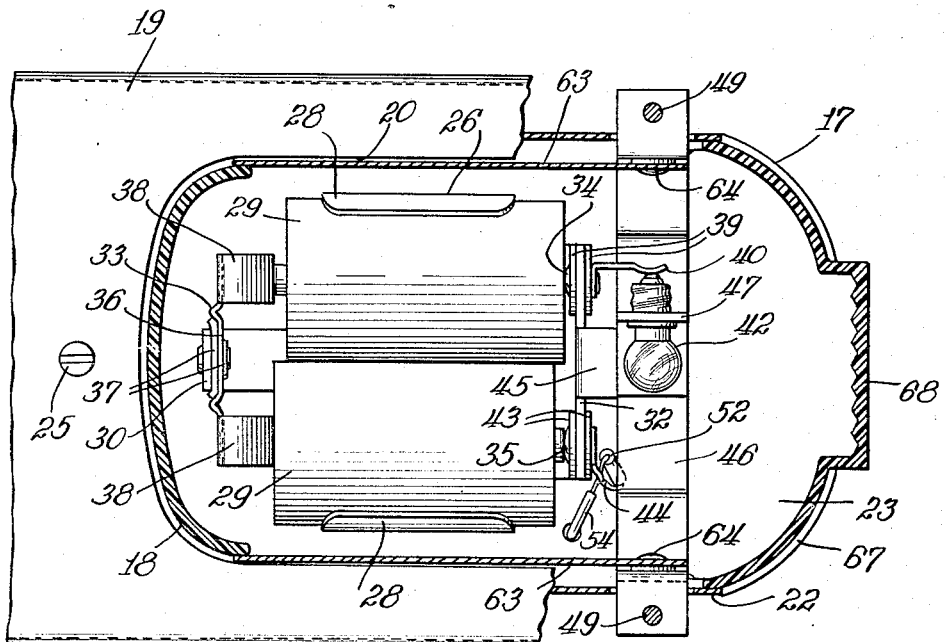
Fig. 3 is a fragmentary top sectional view wherein the section is taken substantially as depicted by a line 3—3 and accompanying arrows in Fig. 2.

Having more detailed reference to the structure of a back light which is particularly adapted to use in the manner shown generally in Fig. 1, attention is directed to Figs. 2, 3 and 4 of the accompanying drawing. As therein shown, the supporting structure or carrier 16 has a top plate 19 which is provided with an opening 20 at the rear end thereof and serves as a part of a top cover for a light housing 22. The light housing 22 further includes a cup-type lower housing portion 23 which is secured to the top plate 19 below the opening 20 by fastening means such as a clamping strip 24 and a screw 25.

The back light unit, in the present instance, being a self contained ensemble, is provided with an internal bracket and battery clip structure 26 which is secured to the bottom of the lower housing by fastening means, such as rivets 27. As shown in Figs. 3 and 4, the bracket and battery clip structure includes oppositely curved and opposed side portions 28 which are adapted to receive and retain two dry battery cells 29 in adjacent and side-by-side relationship therebetween.

At its opposite ends, the bracket and battery retaining element 26 has upwardly extending portions 30 and 32 which carry contacting elements 33, 34 and 35 for making electrical connections to the terminals of the battery cells 29. The contacting element 33 includes a cross arm portion 36 insulated from the upwardly projecting portion 30 by insulating washers 37 and having resilient contact fingers 38 at its opposite ends for connecting the oppositely disposed battery cells in series circuit relationship. The contacting element 34 is insulated from the upwardly extending portion 32 by insulating washers 39 and is electrically connected to a spring finger 40 through which contact is made with one terminal of a light bulb 42. The contacting element 35 is insulated from the upwardly extending portion 32 by insulating washers 43, and has a terminal 44 connected thereto.

Integrally formed on the upwardly extending portion 32 is an outwardly projecting bracket portion 45 which carries a formed strap type cross bracket 46 and an angular bracket type light bulb socket 47; which cross bracket and socket are secured to the bracket portion 45 by fastening means, such as a rivet 48. To provide additional support for the light unit relative to the supporting structure 16, opposite ends of the cross bracket are secured to the top plate 19 by fastening means such as screws 49.

With the disclosed structure and arrangement of batteries, terminals and connecting elements, one terminal of the series connected battery cells is connected to one terminal of the light bulb 42 through the spring finger 40. The other terminal of the light bulb 42 is grounded through the socket 47. For providing one circuit between the other battery terminal and the grounded terminal of the light bulb, I have provided a manually operable switch 50 and a resistor 52 connected in series between the terminal 44 and the lower portion 23 of the housing, thereby to complete an electrical connection between the other terminal of the series connected battery cells to the light bulb through the dimming resistor 52. When the dimming resistor 52 is used, a second circuit is provided, as shown in Fig. 4, through connecting leads 54 and 55 and a switch 56, between the terminal 44 and the lower portion 23 of the housing, which second circuit effectively short circuits the dimming resistor 52 to cause the light bulb to burn at a full brilliance. The switch 56 may be one actuated by either a hand or coaster brake, or a separate manually operable switch, as desired, for effecting selection of the period at which the illumination of the light bulb is increased. The switch 50, in the present instance, and as shown in Fig. 4, includes a movable switch arm 57 having a portion 58 projecting through the bottom of the lower housing portion 23 and supported for swinging movement to and from engagement with a stationary contact 59 and relative to the upwardly projecting portion 32 by means such as a rivet 60. The stationary contact 59 is supported by the upwardly projecting portion 32 and insulated therefrom.

At the top of the housing, I have provided a cover plate 62 which is hingedly mounted at one end for swinging movement relative to the lower portion 23 of the housing and between open and closed positions; the closed position being in substantially flush relationship to the top plate 19 of the supporting structure, and the open position being one in which the cover plate extends upwardly in acute angular relationship to the general plane of the top plate 19. In each instance, the cover plate 62 fits into and forms a closure for the opening 20 in the top plate.

In the embodiment depicted in Figs. 2, 3 and 4, the hinge mounting of the cover plate 62 is provided by side wings 63 integrally formed on opposite sides of the cover plate and movably connected to opposite sides of the cross bracket 46 by fastening means such as aligned rivets 64. The side wings 63 on the cover plate are of generally triangular shape, diverging in width from the hinge axis provided by the rivet 64, so that the side wings move into the lower portion 23 of the housing through the opening 20 when the cover plate is moved to the closed position, and bridge the space between the cover plate 62 and the top plate 19 when the cover plate is swung to its open position.

At the end of the cover plate opposite the hinge axis, the lens element 18 is secured to the cover plate and extends angularly therefrom, as well as bridging the space between the ends of the opposed side wings 63. In the disclosed structure, the lens element is laterally curved, as well as being curved in a vertical plane in substantially concentric relationship to the hinge axis of the cover plate. The lens element fits into the opening 20 and has a flange 66 along its lower edge which is adapted to engage the top plate 19, as shown in Fig. 2, to serve as a stop for limiting the upward swinging movement of the cover plate relative to the lower housing portion. With this arrangement of parts, the lens element 18 and side wings 63 on the cover plate 62 telescope into the lower portion 23 of the housing when the cover plate closes the opening 20, and projects upwardly in the nature of a housing extension when the cover plate is in its raised position, as shown in Fig. 2. In the latter position, light from the light bulb 42 is projected upwardly and forwardly through the lens 18.

Having the lens 18 curved laterally, as disclosed, it is visible directly from the side, when the light unit is in use. The vertical curvature of the lens is provided for maintaining a relatively close fit of the lens in the opening 20 as it is moved between its raised and closed positions about the hinge axis of the cover plate. As indicated in Fig. 1, the light projected through the lens 18 and from the disclosed light unit illuminates parts of the bicycle and the back of the cycle rider, so that they are clearly visible to pedestrians and the drivers of other vehicles, even though they are not in the direct beam of the vehicle headlight. Also, when used on a bicycle having a headlight, both the front and rear of the cycle and its direction of motion are clearly and quickly discernible to any observer.

As an added safety feature, an opening 67 is provided in the rear end of the lower housing portion 23, immediately behind the light bulb 42. This opening is covered by a tail light lens 68 which is preferably colored red and which, as disclosed herein, is shaped so as to be visible from the sides, as well as directly from the back.

Figure 5:
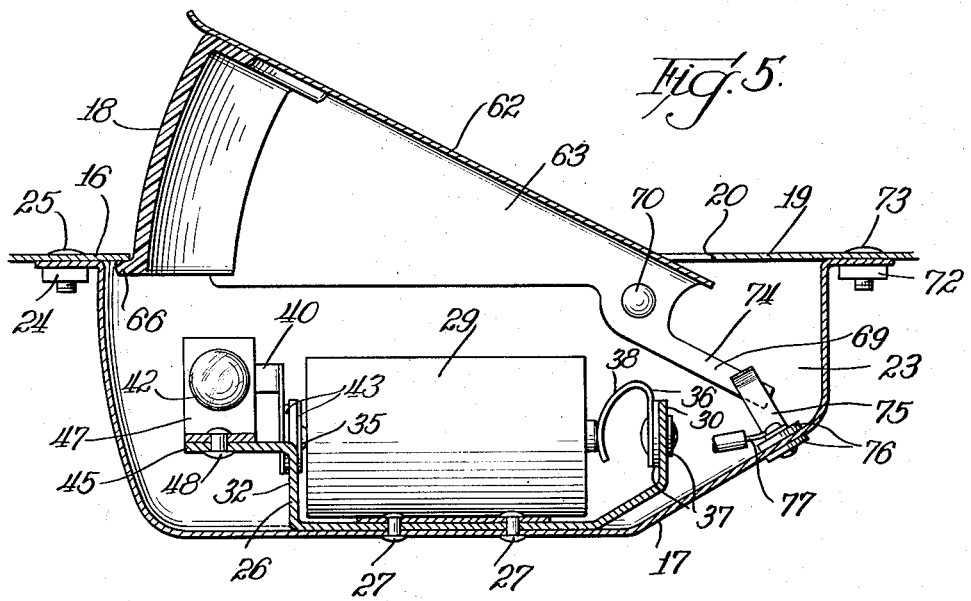
Fig. 5 is a side sectional view similar to Fig. 2 but illustrating a modified form of my back light unit.

In the modified form of my invention which is illustrated in Fig. 5, the general structure and arrangement of the parts are quite similar to that illustrated and described in connection with the form shown in Figs. 1 to 4 inclusive. However, in this modified form, the battery clip and supporting structure 26 is reversed with respect to the housing, so that the light bulb 42 is near the front end of the housing. Also, the opening at the rear of the lower portion of the housing and the tail light lens 68 of the first described form have been omitted. Additionally, a switch 69 is provided in the form illustrated in Fig. 5, which switch is actuated to its open and closed positions by the raising and lowering movements of the cover plate 62. In this modified structure, no provision is made for varying the brilliance of the illumination of the light bulb 42.

The cover plate 62, in Fig. 5, is hinged directly to the lower housing portion 23 by means, such as aligned rivets 70, and the rear end of the lower housing portion is secured to the top plate 19 by fastening means, such as a clamping strip 72 and screws 73. The switch 69 includes a movable contact arm 74 which is secured to and projects rearwardly from one of the side wings 63 on the cover plate 62. When the cover plate is moved upwardly to the position depicted in Fig. 5, the movable contact arm 74 is moved into engagement with a stationary contact element 75; the latter contact element being secured to the lower housing portion 23 and insulated therefrom by insulating washers 76. The switch 69 completes an electrical circuit to ground, and thus to one side of the light bulb 42, from one terminal of the battery cells through a connecting lead 77. With this arrangement of parts, the light bulb 42 can only be lit when the cover plate 62 is in its raised position for the projection of light through the lens 18. Also, with this arrangement the cover plate 62 is in substantially flush relationship to the top plate 19 of the supporting structure when the light unit is not in use.

Figure 6:
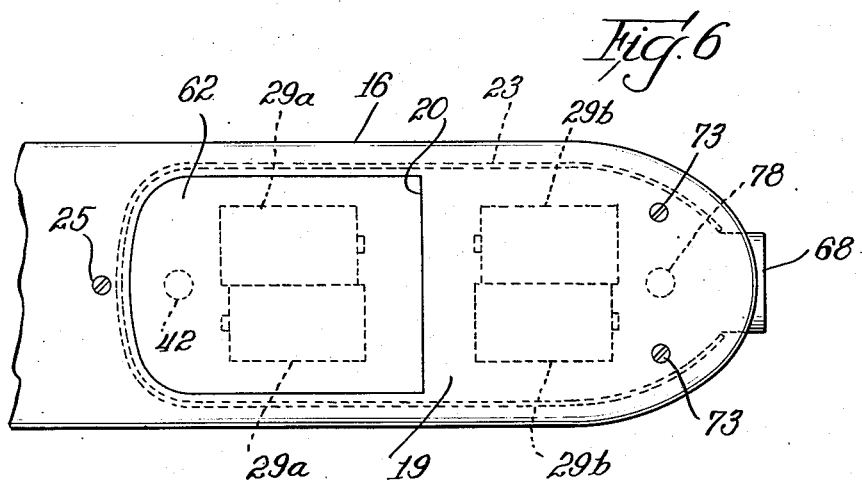
Fig. 6 is a fragmentary top plan view of another modified form of my back light unit.

In the modification of my invention which is illustrated in Fig. 6, the back light and tail light are separated, so as to be independently operable. In this instance, the structure and arrangement of the operating parts of the back light are substantially like those illustrated and described in connection with the form shown in Fig. 5. In addition, a similar and separate battery clip and supporting bracket structure, like that shown in Figs. 2 to 5 inclusive of the drawings, is mounted at the rear of the lower housing portion with a light bulb 78 at the rear end thereof and adjacent the tail light lens 68, like that shown in Figs. 2 and 3. Separate pairs of series connected battery cells 29a and 29b are provided for illuminating the light bulb 42 of the back light and the light bulb 78 of the tail light.

From the foregoing description and reference to the accompanying drawings, it may be readily appreciated that I have provided a unique back light ensemble and combination adapted particularly to use on cycles and the like for promoting the safety of cycle riders for night riding. The structure and arrangement, as herein disclosed, affords effective illumination of the cycle and its rider without interfering with the rider's vision. Furthermore, the structure and arrangement of the light unit and its support are such that it is compact, easily accessible and light in weight.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A light for a cycle and its rider comprising a carrier on the cycle including a load carrying platform disposed behind the rider, a plate forming part of the platform, a hinge for the plate disposed transversely of the cycle, said hinge permitting raising the front end of the plate relative to the platform, a source of light located below the hinged plate and adapted to produce a beam of light which passes between the raised end of the plate and the platform to illuminate the back of the rider, a housing for the light disposed below the carrier and a window in the rear of the housing and in line with the light whereby to produce a rearwardly directed beam of light.

2. A lighting system for a cycle and its rider, said system comprising means on said cycle for producing forwardly and rearwardly directed beams of light, means on said cycle behind said rider for producing a forwardly and upwardly directed beam of light for illuminating the back of the rider and a carrier mounted on the cycle to the rear of the rider, said carrier including a load-carrying platform, and said last mentioned means including a hinged plate forming part of said platform and adapted in one position to obstruct said forwardly and upwardly directed beam of light and in another position to permit passage of said beam of light to the back of the rider, and a source of light below the hinged plate.

3. A lighting system for a cycle and its rider, said system comprising means forward of the rider for producing a forwardly directed beam of light, means to the rear of the rider for producing a rearwardly directed beam of light, a carrier on the cycle disposed to the rear of the rider, said carrier having a load-carrying platform, a plate forming a part of the platform and being hinged at one end transversely of the cycle, and means disposed between the rider and the rear light producing means and adapted to produce a beam of light directed forwardly and upwardly to illuminate the back of the rider, said last-mentioned light producing means being disposed below said hinged plate so that the plate assists in directing the beam of light toward the rider as aforesaid.

References Cited in the file of this patent

UNITED STATES PATENTS

| Number | Name | Date |
|---|---|---|
| 1,965,801 | Gandillon | July 10, 1934 |
| 2,198,077 | Curtis | Apr. 23, 1940 |
| 2,301,250 | Callan | Nov. 10, 1942 |
| 2,421,680 | Candlin, Jr., et al. | June 3, 1947 |
| 2,433,469 | Malmquist | Dec. 30, 1947 |
| 2,465,114 | Oury | Mar. 22, 1949 |

FOREIGN PATENTS

| Number | Country | Date |
|---|---|---|
| 537,074 | Great Britain | June 9, 1941 |